(12) United States Patent
Albertson et al.

(10) Patent No.: US 8,011,331 B2
(45) Date of Patent: Sep. 6, 2011

(54) EIGHT-STROKE ENGINE CYCLE

(75) Inventors: William C. Albertson, Clinton Township, MI (US); Joseph J. Moon, Clawson, MI (US); Akram R. Zahdeh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 452 days.

(21) Appl. No.: 12/209,615

(22) Filed: Sep. 12, 2008

(65) Prior Publication Data

US 2010/0064992 A1   Mar. 18, 2010

(51) Int. Cl.
*F02B 75/00*   (2006.01)
*F02B 69/06*   (2006.01)

(52) U.S. Cl. ........................................... 123/37; 123/21

(58) Field of Classification Search ............... 123/21, 123/37, 64, 90.11–90.13, 90.16–90.18
See application file for complete search history.

(56) References Cited

U.S. PATENT DOCUMENTS

| | | | |
|---|---|---|---|
| 4,892,067 A * | 1/1990 | Paul et al. ................... | 123/90.12 |
| 4,930,465 A * | 6/1990 | Wakeman et al. ......... | 123/90.12 |
| 5,154,143 A * | 10/1992 | Stutzenberger ............ | 123/90.12 |
| 5,680,841 A * | 10/1997 | Hu .............................. | 123/90.12 |
| 5,732,677 A | 3/1998 | Baca ............................. | 123/316 |
| 6,443,108 B1 * | 9/2002 | Brehob et al. .................. | 123/64 |
| 6,918,358 B2 | 7/2005 | Hu ................................. | 123/58.8 |
| 7,624,709 B2 * | 12/2009 | Cao ................................. | 123/64 |

* cited by examiner

*Primary Examiner* — Noah Kamen
(74) *Attorney, Agent, or Firm* — Harness, Dickey & Pierce, P.L.C.

(57) ABSTRACT

An eight-stroke engine cycle may include a first stroke forming an intake stroke and including opening an intake valve and providing a first fuel mass to the combustion chamber. The second stroke may form a first compression stroke and the third stroke may form a first expansion stroke including a first power stroke. The fourth and sixth strokes may form a second and third compression strokes and the fifth and seventh strokes may form a second and third expansion strokes. A second fuel mass may be provided to the combustion chamber during the fourth or sixth stroke. The intake valve may be in a closed position during the second and third expansion strokes and an exhaust valve in communication with the combustion chamber may be in a closed position during the second and third compression strokes. The eighth stroke may form an exhaust stroke including opening the exhaust valve.

19 Claims, 8 Drawing Sheets

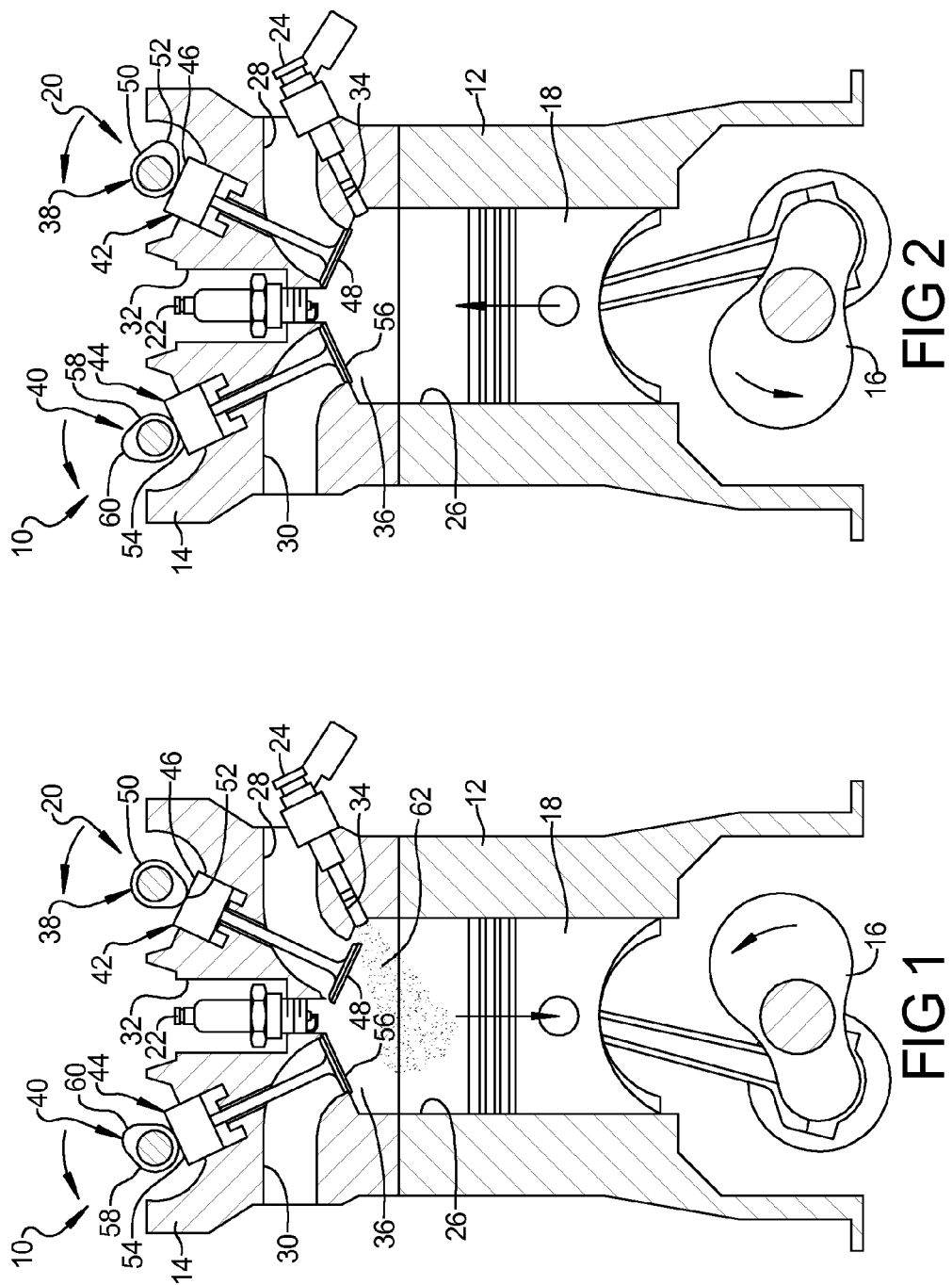

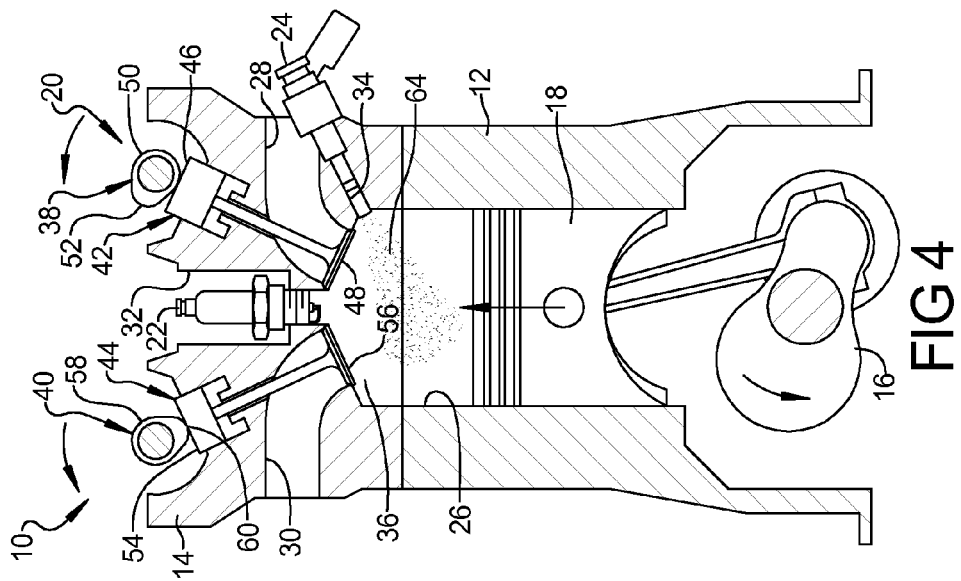
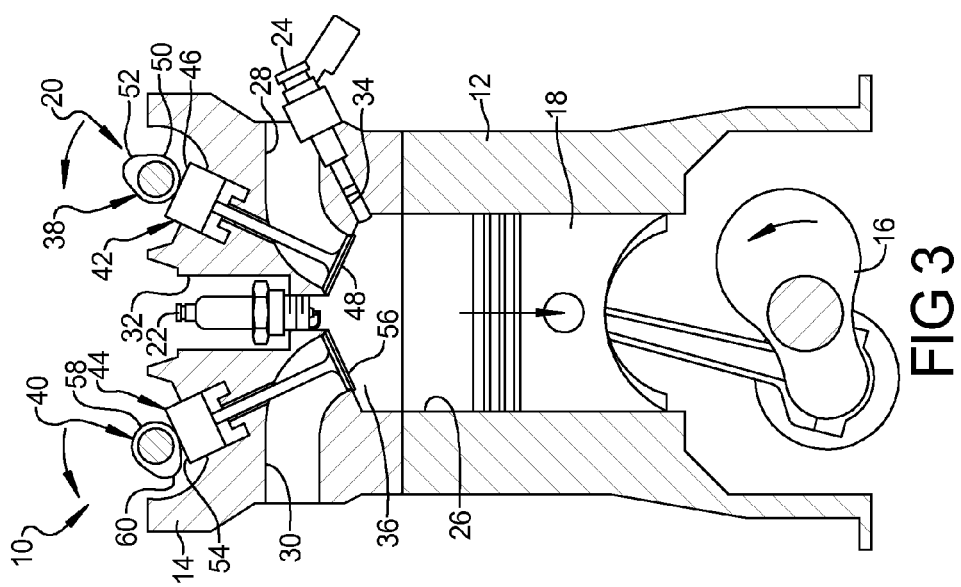

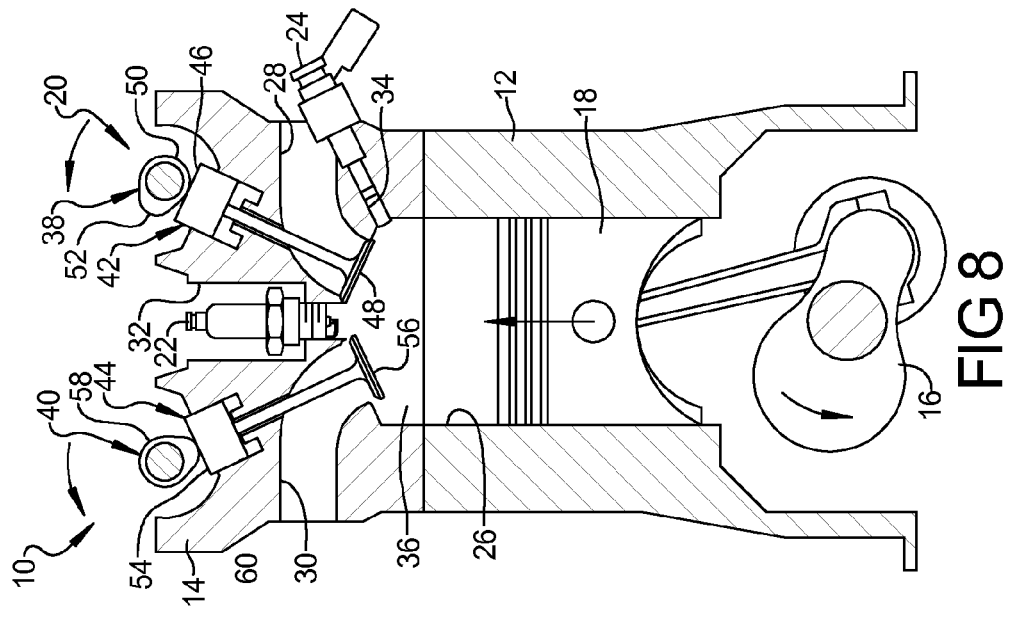
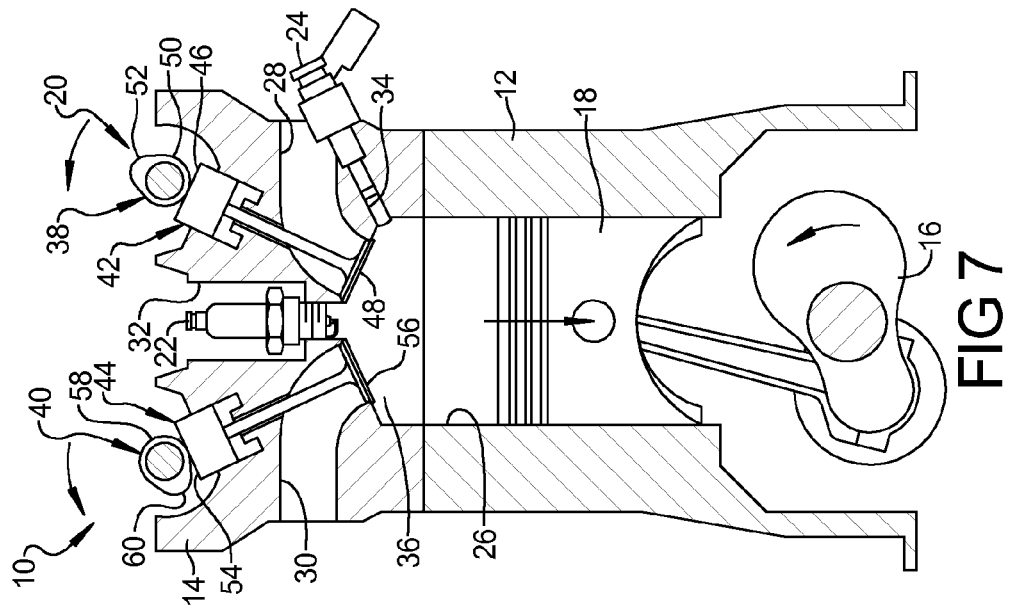

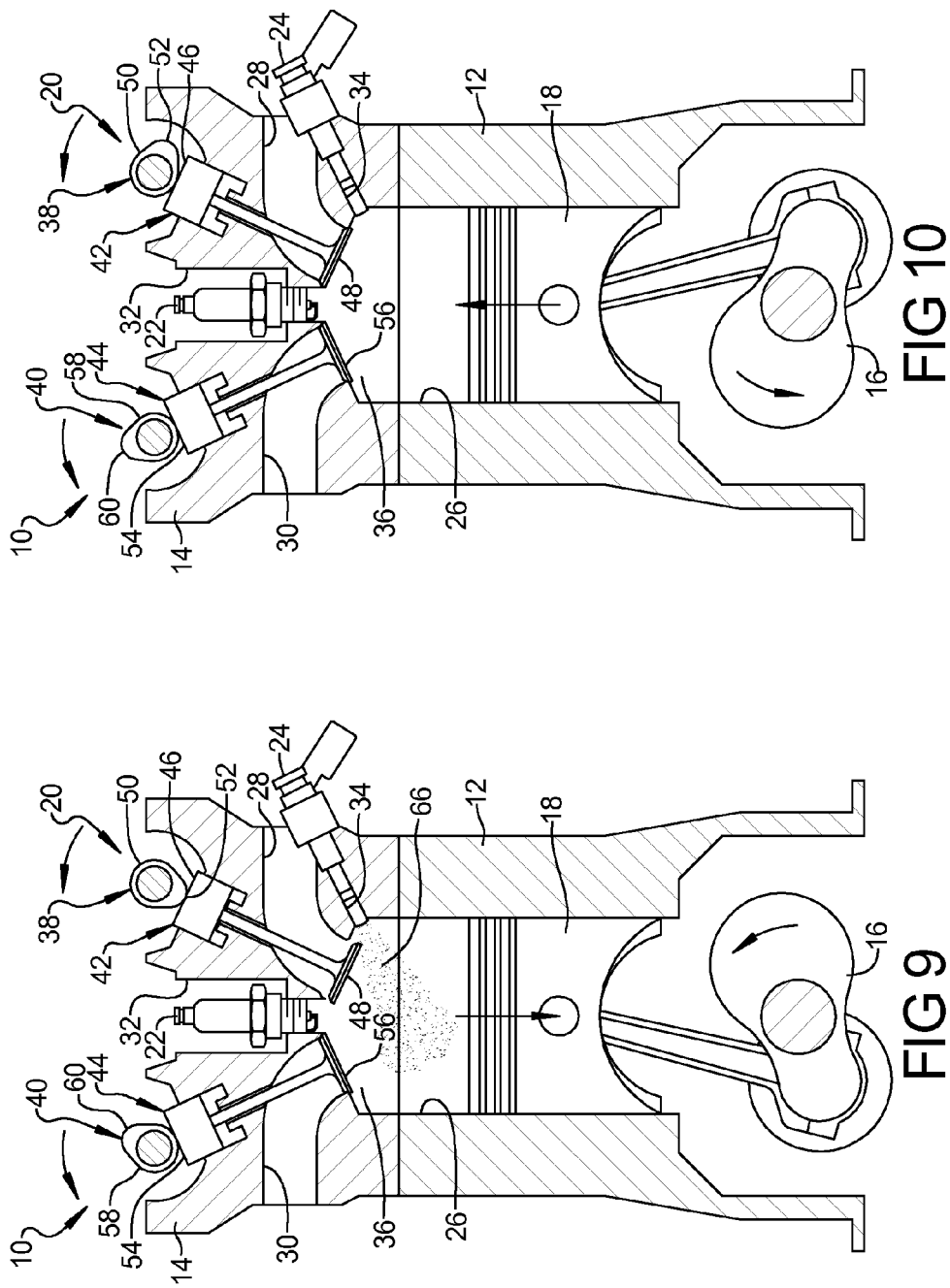

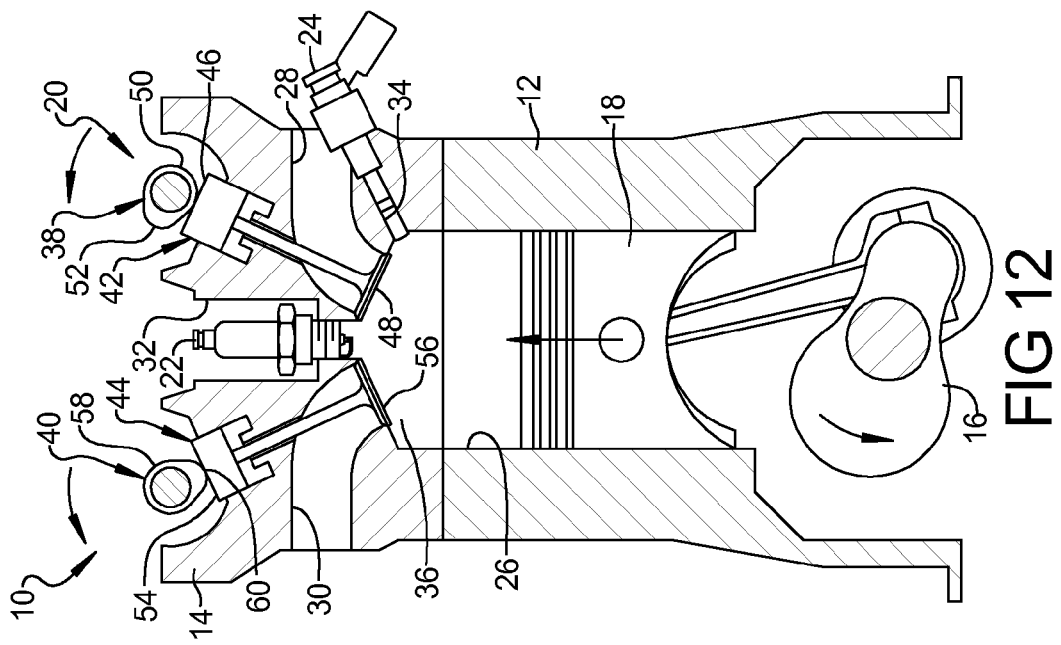
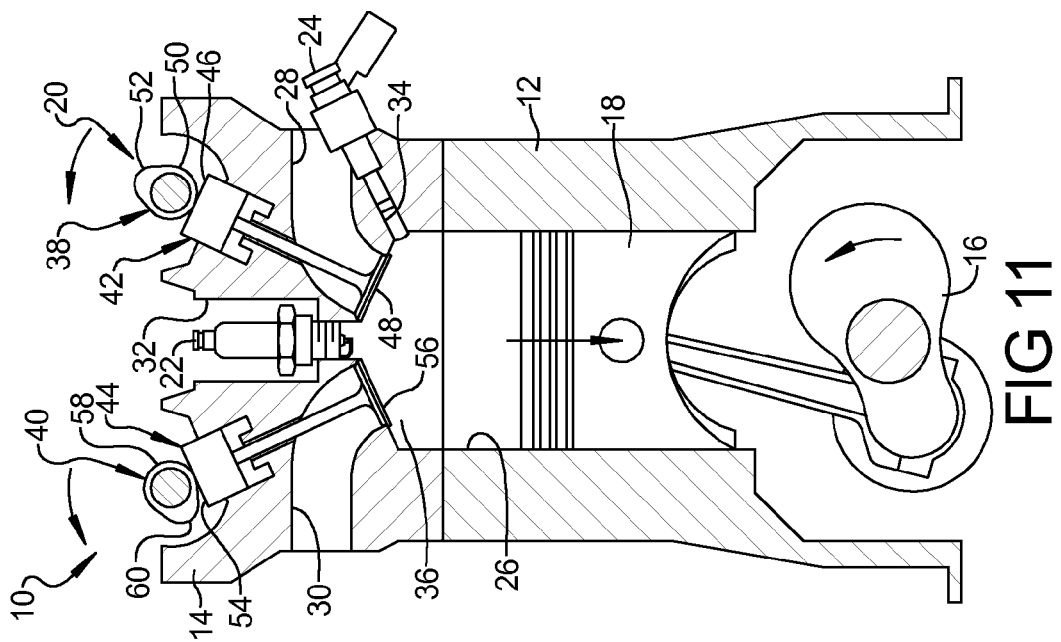

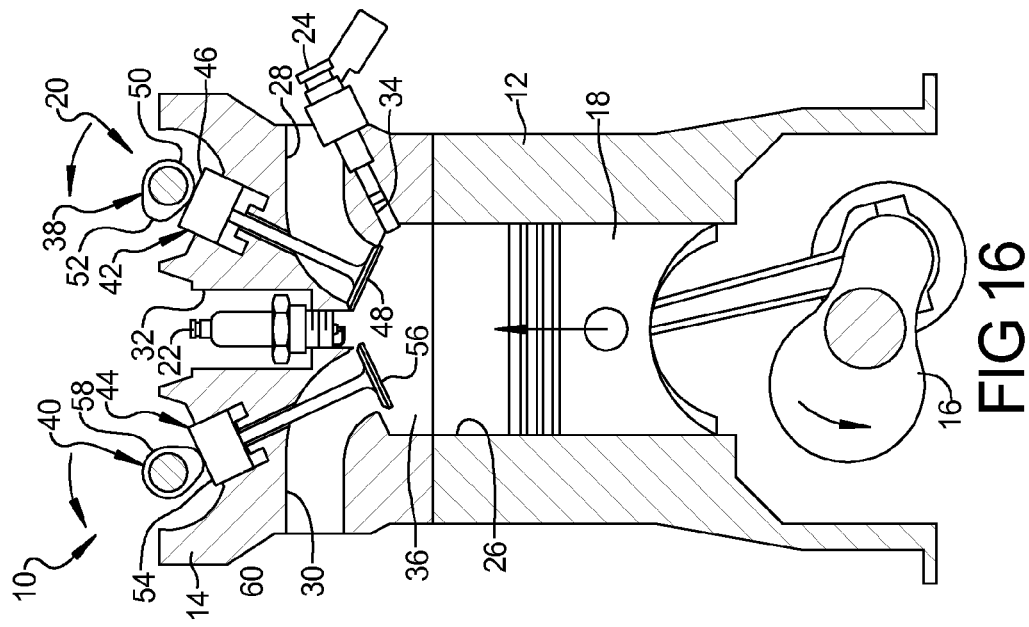
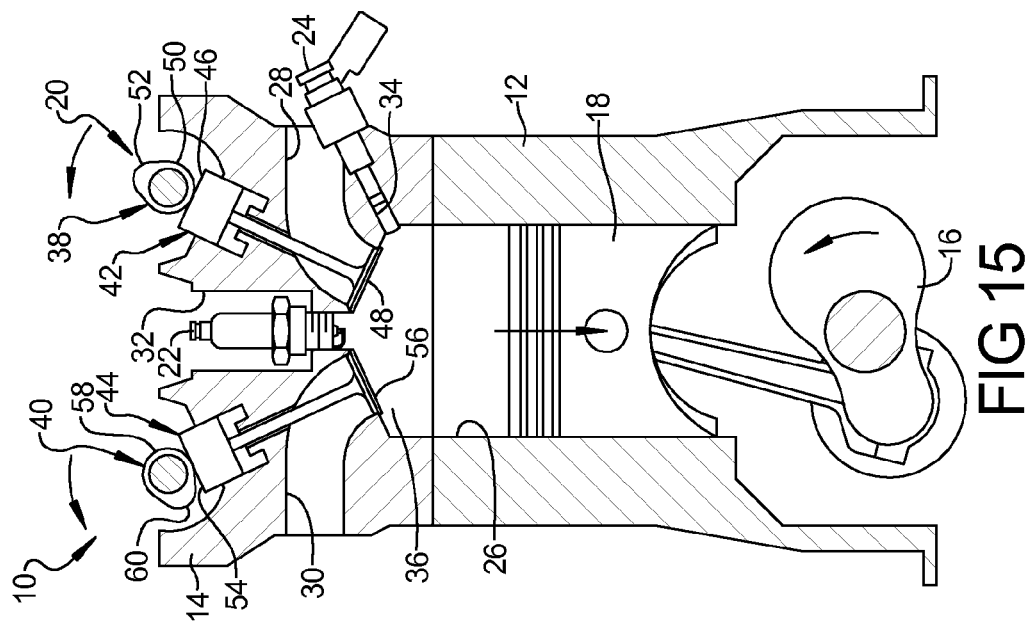

US 8,011,331 B2

EIGHT-STROKE ENGINE CYCLE

FIELD

The present disclosure relates to internal combustion engines, and more specifically to an eight-stoke engine cycle for an internal combustion engine.

BACKGROUND

The statements in this section merely provide background information related to the present disclosure and may not constitute prior art.

Conventional gasoline internal combustion engine operation may include a four-stroke engine cycle. The four-stroke cycle may include a first intake stroke where an air-fuel mixture is provided to an engine cylinder, a second stroke where the air-fuel mixture is compressed, a third stroke (power stroke) where the air-fuel mixture is ignited, and a fourth stroke where the residual air-fuel mixture and combustion gases are exhausted from the cylinder.

SUMMARY

An eight-stroke engine cycle may include a first stroke forming an intake stroke and including opening an intake valve and providing a first fuel mass to a combustion chamber. The second stroke may form a first compression stroke and the third stroke may form a first expansion stroke including a first power stroke where the air-fuel mixture provided in the first stroke is ignited. The fourth stroke may form a second compression stroke where an exhaust valve in communication with the combustion chamber is in a closed position. The fifth stroke may form a second expansion stroke where the intake valve is in the closed position. The sixth stroke may form a third compression stroke where the exhaust valve is in the closed position. A second fuel mass may be provided to the combustion chamber during the fourth or sixth stroke. The seventh stroke may form a third expansion stroke where the intake valve is in the closed position. The eighth stroke may form an exhaust stroke including opening the exhaust valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a schematic illustration of an engine assembly depicting a first stroke of a first eight-stroke cycle according to the present disclosure;

FIG. 2 is a schematic illustration of the engine assembly of FIG. 1 depicting a second stroke of the first eight-stroke cycle;

FIG. 3 is a schematic illustration of the engine assembly of FIG. 1 depicting a third stroke of the first eight-stroke cycle;

FIG. 4 is a schematic illustration of the engine assembly of FIG. 1 depicting a fourth stroke of the first eight-stroke cycle;

FIG. 7 is a schematic illustration of the engine assembly of FIG. 1 depicting a seventh stroke of the first eight-stroke cycle;

FIG. 8 is a schematic illustration of the engine assembly of FIG. 1 depicting an eighth stroke of the first eight-stroke cycle;

FIG. 9 is a schematic illustration of the engine assembly of FIG. 1 depicting a first stroke of a second eight-stroke cycle according to the present disclosure;

FIG. 10 is a schematic illustration of the engine assembly of FIG. 1 depicting a second stroke of the second eight-stroke cycle;

FIG. 11 is a schematic illustration of the engine assembly of FIG. 1 depicting a third stroke of the second eight-stroke cycle;

FIG. 12 is a schematic illustration of the engine assembly of FIG. 1 depicting a fourth stroke of the second eight-stroke cycle;

FIG. 15 is a schematic illustration of the engine assembly of FIG. 1 depicting a seventh stroke of the second eight-stroke cycle; and FIG. 16 is a schematic illustration of the engine assembly of FIG. 1 depicting an eighth stroke of the second eight-stroke cycle.

DETAILED DESCRIPTION

Figure 5:
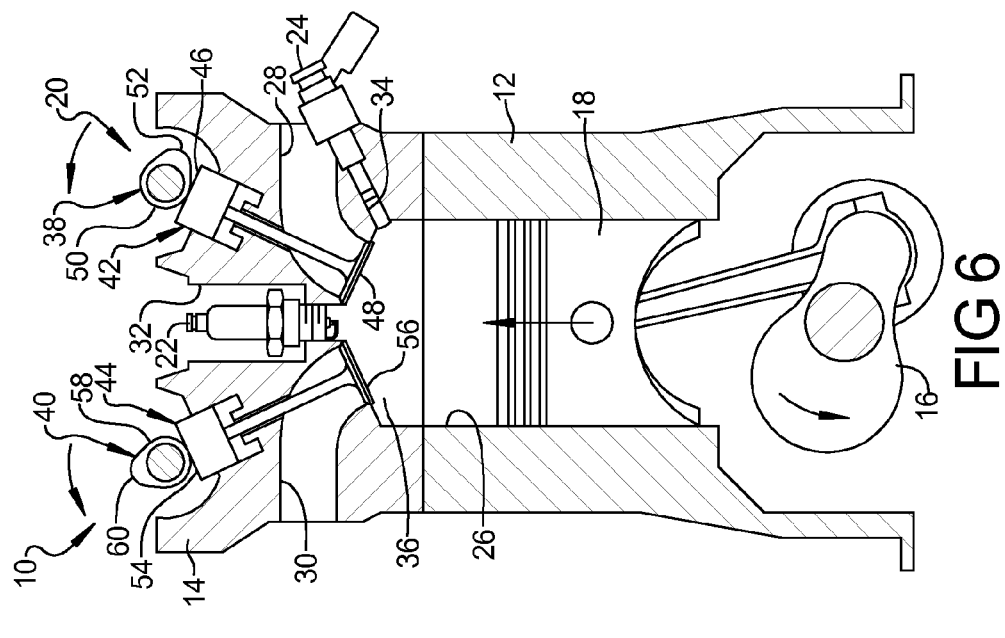
FIG. 5 is a schematic illustration of the engine assembly of FIG. 1 depicting a fifth stroke of the first eight-stroke cycle.
Figure 6:
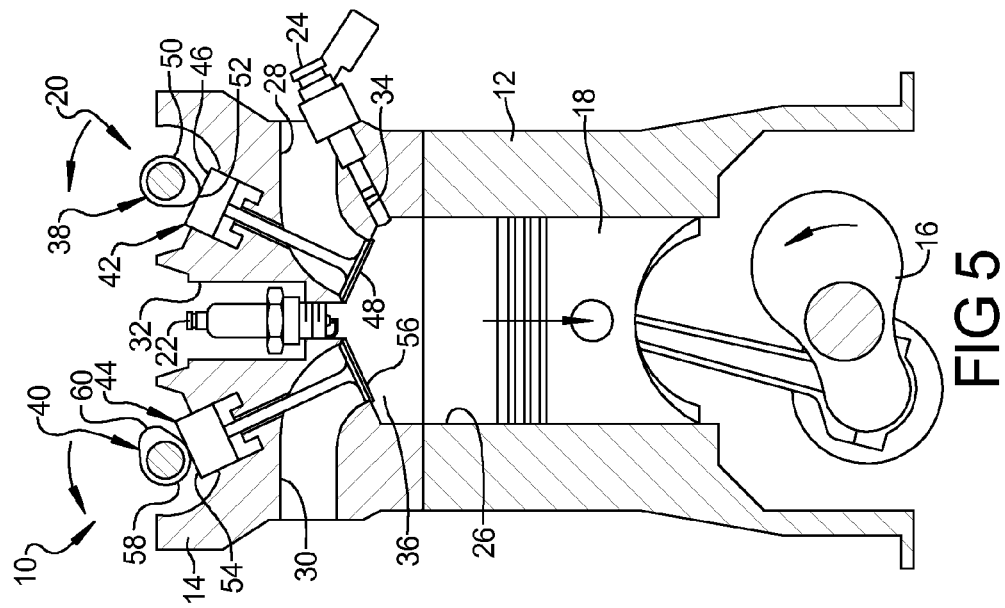
FIG. 6 is a schematic illustration of the engine assembly of FIG. 1 depicting a sixth stroke of the first eight-stroke cycle.

The following description is merely exemplary in nature and is not intended to limit the present disclosure, application, or uses. It should be understood that throughout the drawings, corresponding reference numerals indicate like or corresponding parts and features.

As seen in FIGS. 1-16, an engine assembly 10 may include an engine block 12, a cylinder head 14, a crankshaft 16, pistons 18 (one of which is shown), a valvetrain assembly 20, a spark plug 22, and a fuel injector 24. The engine block 12 may define cylinder bores 26 (one of which is shown) each having a piston 18 disposed therein. It is understood that the present teachings apply to any number of piston-cylinder arrangements and a variety of engine configurations including, but not limited to, V-engines, inline engines, and horizontally opposed engines, as well as both overhead cam and cam-in-block configurations.

The cylinder head 14 may include intake and exhaust passages 28, 30, a spark plug housing 32, and a fuel injector housing 34. The engine block 12, cylinder head 14, and piston 18 may cooperate to define a combustion chamber 36. The spark plug 22 may be located in the spark plug housing 32, extending into and in communication with the combustion chamber 36. The fuel injector 24 may be located in the fuel injector housing 34, extending into and in communication with the combustion chamber 36, forming a direct injection configuration. The valvetrain assembly 20 may be supported by the cylinder head 14 and may include intake and exhaust camshafts 38, 40 and intake and exhaust valve assemblies 42, 44. The intake camshaft 38 may be engaged with the intake valve assembly 42 and the exhaust camshaft 40 may be engaged with the exhaust valve assembly 44.

The intake valve assembly 42 may include a valve displacement mechanism 46 and an intake valve 48. The valve displacement mechanism 46 may be engaged with the intake valve 48 and the intake camshaft 38 and may selectively transfer motion from the intake camshaft 38 to displace the intake valve 48 between open and closed positions. The valve displacement mechanism 46 may include a biasing member (not shown) that normally biases the intake valve 48 to the closed position and a valve lift mechanism (not shown) engaged with a lobe 50 of the intake camshaft 38.

Figure 13:
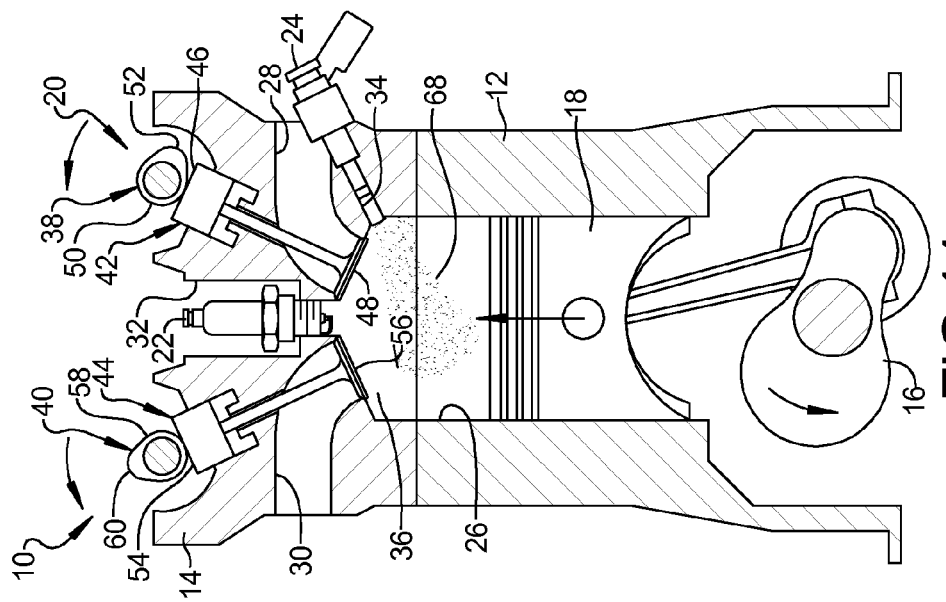
FIG. 13 is a schematic illustration of the engine assembly of FIG. 1 depicting a fifth stroke of the second eight-stroke cycle.
Figure 14:
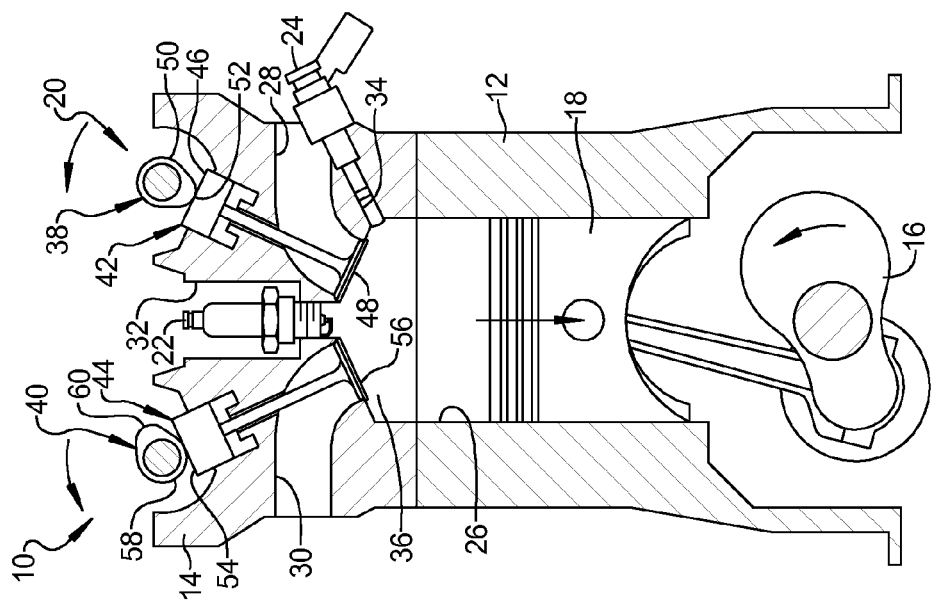
FIG. 14 is a schematic illustration of the engine assembly of FIG. 1 depicting a sixth stroke of the second eight-stroke cycle.

The valve lift mechanism may be operable in first and second modes. In the first mode, the valve lift mechanism may displace the intake valve 48 to the open position when engaged by a peak 52 of the lobe 50 (as seen in FIGS. 1 and 9). In the second mode, the valve lift mechanism may allow the intake valve 48 to remain in the closed position when engaged by the peak 52 of the lobe 50 (as seen in FIGS. 5 and 13). The valve lift mechanism may include a variety of lost motion mechanisms operable in the first and second modes to selectively transfer motion between a camshaft lobe and a valve assembly. The valve lift mechanism may be actuated in a variety of manners including, but not limited to, hydraulic actuation.

The exhaust valve assembly 44 may include a valve displacement mechanism 54 and an exhaust valve 56. The valve displacement mechanism 54 may be engaged with the exhaust valve 56 and the exhaust camshaft 40 and may selectively transfer motion from the exhaust camshaft 40 to displace the exhaust valve 56 between opened and closed positions. The valve displacement mechanism 54 may include a biasing member (not shown) that normally biases the exhaust valve 56 to the closed position and a valve lift mechanism (not shown) engaged with a lobe 58 of the exhaust camshaft 40.

The valve lift mechanism may be operable in first and second modes as discussed above relative to the valve lift mechanism of the intake valve assembly 42. In the first mode, the valve lift mechanism may displace the exhaust valve 56 to the open position when engaged by a peak 60 of the lobe 58 (as seen in FIGS. 8 and 16). In the second mode, the valve lift mechanism may allow the exhaust valve 56 to remain in the closed position when engaged by the peak 60 of the lobe 58 (as seen in FIGS. 4 and 12). The valve lift mechanism may include a variety of lost motion mechanisms operable in first and second modes to selectively transfer motion between a camshaft lobe and a valve assembly. The valve lift mechanism may be actuated in a variety of manners including, but not limited to, hydraulic actuation. While shown as including a single intake valve 48, and a single exhaust valve 56, it is understood that any number of intake and exhaust valves may be used for a given cylinder 26.

FIGS. 1-8 generally illustrate a first non-limiting example of an eight-stroke engine cycle according the present disclosure. As seen in FIG. 1, the first stroke of an eight-stroke engine cycle may include an intake stroke. The first stroke may include the intake valve 48 being in the open position, the exhaust valve 56 being in the closed position, and a first fuel mass 62 being injected into the combustion chamber 36 by the fuel injector 24. The valve lift mechanisms of the intake and exhaust valve assemblies 42, 44 operated in the first mode during the first stroke and may be switched to the second mode after the first stroke. The second stroke, seen in FIG. 2, may form a first compression stroke. The second stroke may be immediately subsequent to the first stroke and may include the intake and exhaust valves 48, 56 each being in the closed position.

As seen in FIG. 3, the third stroke may form a first expansion stroke. The third stroke may be immediately subsequent to the second stroke and may include the intake and exhaust valves 48, 56 each being in the closed position. The third stroke may include a first power stroke where the air-fuel mixture provided during the first stroke is ignited. Ignition of the air-fuel mixture may include spark ignition by the spark plug 22. The fourth stroke, seen in FIG. 4, may form a second compression stroke. The fourth stroke may be immediately subsequent to the third stroke and may include the intake and exhaust valves 48, 56 each being in the closed position. The fourth stroke may include a second fuel mass 64 being injected into the combustion chamber 36.

As seen in FIG. 5, the fifth stroke may form a second expansion stroke. The fifth stroke may be immediately subsequent to the fourth stroke and may include the intake and exhaust valves 48, 56 each being in the closed position. The fifth stroke may include a second power stroke where the residual air within the cylinder from the first power stroke and the second fuel mass are ignited. Ignition of the air-fuel mixture may include spark ignition by the spark plug 22 or a compression ignition. The sixth stroke, seen in FIG. 6, may form a third compression stroke. The sixth stroke may be immediately subsequent to the fifth stroke and may include the intake and exhaust valves 48, 56 each being in the closed position.

As seen in FIG. 7, the seventh stroke may form a third expansion stroke. The seventh stroke may be immediately subsequent to the sixth stroke and may include the intake and exhaust valves 48, 56 each being in the closed position. The valve lift mechanisms of the intake and exhaust valve assemblies 42, 44 may be switched back to the first mode after the seventh stroke. The eighth stroke, seen in FIG. 8, may form an exhaust stroke. The eighth stroke may include the intake valve 48 being in the closed position and the exhaust valve 56 being in the open position. Exhaust gas may exit the combustion chamber 36 during the eighth stroke.

FIGS. 9-16 generally illustrate a second non-limiting example of an eight-stroke engine cycle according the present disclosure. As seen in FIG. 9, the first stroke of an eight-stroke engine cycle may include an intake stroke. The first stroke may include the intake valve 48 being in the open position, the exhaust valve 56 being in the closed position, and a first fuel mass 66 being injected into the combustion chamber 36 by the fuel injector 24. The valve lift mechanisms of the intake and exhaust valve assemblies 42, 44 may be operated in the first mode during the first stroke and may be switched to the second mode after the first stroke. The second stroke, seen in FIG. 10, may form a first compression stroke. The second stroke may be immediately subsequent to the first stroke and may include the intake and exhaust valves 48, 56 each being in the closed position.

As seen in FIG. 11, the third stroke may form a first expansion stroke. The third stroke may be immediately subsequent to the second stroke and may include the intake and exhaust valves 48, 56 each being in the closed position. The third stroke may include a first power stroke where the air-fuel mixture provided during the first stroke is ignited. Ignition of the air-fuel mixture may include spark ignition by the spark plug 22. The fourth stroke, seen in FIG. 12, may form a second compression stroke. The fourth stroke may be immediately subsequent to the third stroke and may include the intake and exhaust valves 48, 56 each being in the closed position.

As seen in FIG. 13, the fifth stroke may form a second expansion stroke. The fifth stroke may be immediately subsequent to the fourth stroke and may include the intake and exhaust valves 48, 56 each being in the closed position. The sixth stroke, seen in FIG. 14, may form a third compression stroke. The sixth stroke may be immediately subsequent to the fifth stroke and may include the intake and exhaust valves 48, 56 each being in the closed position. The sixth stroke may include a second fuel mass 68 being injected into the combustion chamber 36.

As seen in FIG. 15, the seventh stroke may form a third expansion stroke. The seventh stroke may be immediately subsequent to the sixth stroke and may include the intake and exhaust valves 48, 56 each being in the closed position. The seventh stroke may include a second power stroke where the residual air within the cylinder from the first power stroke and the second fuel mass are ignited. Ignition of the air-fuel mixture may include spark ignition by the spark plug 22 or a compression ignition. The valve lift mechanisms of the intake and exhaust valve lift assemblies 42, 44 may be switched back to the first mode after the seventh stroke. The eighth stroke, seen in FIG. 16, may form an exhaust stroke. The eighth stroke may include the intake valve 48 being in the closed position and the exhaust valve 56 being in the open position. Exhaust gas may exit the combustion chamber 36 during the eighth stroke.

In both the first and second eight-stroke engine cycle examples discussed above, the combustion chamber 36 may be generally sealed from the second stroke through the seventh stroke. More specifically, the intake valve 48 may be closed from the second stroke through the eighth stroke and the exhaust valve 56 may be closed from the first stroke through the seventh stroke. Each stroke may correspond to approximately one-hundred and eighty degrees of rotation of the crankshaft 16 and ninety degrees of rotation of camshafts 38, 40. The intake and exhaust camshafts 38, 40 may each rotate at approximately one-half of the rotational speed of the crankshaft.

In order to accomplish either of the eight-stroke cycles discussed above, the intake and exhaust valve lift mechanisms may be switched from the first mode to the second mode after the first stroke and back to the first mode before the eighth stroke. The first and second masses of fuel 62, 64, 66, 68 injected into the combustion chamber 36 may also be controlled to provide a desired air-fuel ratio for the eight-stroke engine cycle. By way of non-limiting example, the air-fuel ratio provided during the first stroke may be lean, having an air-fuel ratio of greater than 14.7-to-1. More specifically, the air-fuel ratio may be greater than 16-to-1. In the present non-limiting example, the fuel may include gasoline and the air-fuel ratio provided during the first stroke is greater than 18-to-1 and approximately 20-to-1. However, it is understood that the present teachings apply to a variety of other fuels including methane. The oxygen concentration within the combustion chamber 36 provided during the first stroke may include at least ten percent oxygen. In the present non-limiting example, the oxygen concentration within the combustion chamber 36 during the first stroke may be approximately twenty percent.

The air-fuel ratio provided during the first stroke of each of the first and second eight-stroke engine cycles may provide a residual oxygen concentration within the combustion chamber 36 after the third stroke (the first power stroke). The residual oxygen concentration may include at least five percent oxygen concentration within the combustion chamber. In the present non-limiting example, the oxygen concentration within the combustion chamber 36 after the third stroke may be approximately eight percent. The second mass of fuel 64, 68 injected into the combustion chamber 36 may be adjusted based on the oxygen concentration within the combustion chamber 36 to provide a generally stoichiometric air-fuel ratio of approximately 14.7-to-1. As a result, the exhaust gas exiting the combustion chamber 36 during the eighth stroke may have a generally stoichiometric air-fuel ratio, allowing for the use of conventional exhaust aftertreatment components.

The engine assembly 10 shown in FIGS. 1-16 may be switched between the eight-stroke cycles discussed above and a conventional four-stroke cycle through use of the fuel injector 24 and the valve displacement mechanisms 46, 54. Specifically, the intake and exhaust valve lift mechanisms may be operated in the first mode during each of the eight strokes discussed above to provide conventional four-stroke engine operation. Therefore, the first stroke of the four-stroke cycle may be similar to FIGS. 1 and 9, the second stroke may be similar to FIGS. 2 and 10, the third stroke may be similar to FIGS. 3 and 11, and the fourth stroke may be similar to FIGS. 8 and 16. As discussed above, the intake and exhaust valve lift mechanisms may be selectively switched to the second mode to provide engine operation in the eight-stroke cycle. The engine assembly 10 may be operated in the four-stroke cycle during high engine load conditions and may be operated in the eight-stroke cycle during light engine load conditions.

Further, the engine assembly 10 may have the same firing frequency and firing order during both four-stroke and eight-stroke cycle operation. The firing order and frequency may be the same because there are two firing events for each cylinder bore 26 per seven-hundred and twenty degrees of crankshaft rotation even though there is only one intake valve opening event and one exhaust valve opening event per seven-hundred and twenty degrees of crankshaft rotation for each of the eight-stroke cycles.

It is further understood that while a direct injection system is illustrated, a two injector system may be used as well. For example, one injector may be directly in communication with the combustion chamber as illustrated in FIGS. 1-16, while a second injector is in communication with the intake port or manifold. The second injector may be used for the first fuel injection during the eight-stroke engine cycle and the second injector may be used for the second fuel injection.

What is claimed is:

1. A method comprising:
   operating an engine in an eight-stroke mode including:
   a first stroke forming an intake stroke and including opening an intake valve via a first peak of a first cam lobe to provide communication between an air source and a combustion chamber formed by an engine structure defining a cylinder bore and a piston disposed within the cylinder bore, the first stroke further including providing a first fuel mass to the combustion chamber;
   a second stroke immediately subsequent to the first stroke and forming a first compression stroke;
   a third stroke immediately subsequent to the second stroke and forming a first expansion stroke, the first expansion stroke including a first power stroke where the air-fuel mixture provided in the first stroke is ignited;
   a fourth stroke immediately subsequent to the third stroke and forming a second compression stroke, the fourth stroke including an exhaust valve in communication with the combustion chamber being in a closed position and preventing discharge of gas from within the combustion chamber when a valve lift mechanism engaged with the exhaust valve is engaged by a second peak of a second cam lobe;
   a fifth stroke immediately subsequent to the fourth stroke and forming a second expansion stroke, the second expansion stroke including the intake valve being in the closed position when a valve lift mechanism engaged with the intake valve is engaged by the first peak of the first cam lobe;

a sixth stroke immediately subsequent to the fifth stroke and forming a third compression stroke, the third compression stroke including the exhaust valve being in the closed position, a second fuel mass being provided to the combustion chamber during the fourth or sixth stroke;

a seventh stroke immediately subsequent to the sixth stroke and forming a third expansion stroke, the third expansion stroke including the intake valve being in the closed position; and an eighth stroke immediately subsequent to the seventh stroke, the eighth stroke forming an exhaust stroke and including opening the exhaust valve via the second peak of the second cam lobe.

2. The method of claim 1, wherein the intake valve is in the closed position from the second stroke through the eighth stroke.

3. The method of claim 1, wherein the exhaust valve is in the closed position from the first stroke through the seventh stroke.

4. The method of claim 1, wherein the combustion chamber is generally sealed from the second stroke through the seventh stroke.

5. The method of claim 1, wherein the first power stroke includes a spark ignition of the air-fuel mixture provided in the first stroke.

6. The method of claim 1, wherein a stroke immediately subsequent to the second fuel mass being provided to the combustion chamber includes a second power stroke.

7. The method of claim 6, wherein the second power stroke includes a spark ignition of the second fuel mass.

8. The method of claim 6, wherein the second power stroke includes a compression ignition of the second fuel mass.

9. The method of claim 1, wherein an air-fuel ratio provided during the first stroke is greater than 14.7-to-1.

10. The method of claim 9, wherein the combustion chamber includes an oxygen concentration of at least 5% after the first power stroke.

11. The method of claim 1, wherein the first and second fuel masses are injected directly into the combustion chamber.

12. The method of claim 1, further comprising operating the engine in a four-stroke mode by allowing opening of the exhaust valve during the fourth stroke and opening of the intake valve during the fifth stroke.

13. The method of claim 12, wherein the engine includes a plurality of pistons disposed in cylinders, the pistons having an identical firing frequency in the four-stroke and eight-stroke modes.

14. The method of claim 13, wherein a firing order of the pistons in the four-stroke mode is the same as a firing order of the pistons in the eight-stroke mode.

15. The method of claim 1, wherein each of the first, second, third, fourth, fifth, sixth, seventh, and eighth strokes corresponds to approximately 180 degrees of rotation of a crankshaft engaged with the piston.

16. The method of claim 15, wherein the first and second cam lobes rotate at approximately one-half of the rotational speed of the crankshaft.

17. The method of claim 1, wherein an exhaust gas exiting the combustion chamber during the exhaust stroke has an air-fuel ratio of approximately 14.7-to-1.

18. A method of operating an engine in an eight-stroke mode comprising:

a first stroke forming an intake stroke and including opening an intake valve via a first peak of a first cam lobe to provide communication between an air source and a combustion chamber formed by an engine structure defining a cylinder bore and a piston disposed within the cylinder bore, the first stroke further including providing a first fuel mass to the combustion chamber;

a second stroke immediately subsequent to the first stroke and forming a first compression stroke;

a third stroke immediately subsequent to the second stroke and forming a first expansion stroke, the first expansion stroke including a first power stroke where the air-fuel mixture provided in the first stroke is ignited;

a fourth stroke immediately subsequent to the third stroke and forming a second compression stroke, the fourth stroke including an exhaust valve in communication with the combustion chamber being in a closed position and preventing discharge of gas from within the combustion chamber when a valve lift mechanism engaged with the exhaust valve is engaged by a second peak of a second cam lobe and including providing a second fuel mass to the combustion chamber;

a fifth stroke immediately subsequent to the fourth stroke and forming a second expansion stroke including the intake valve being in the closed position when a valve lift mechanism engaged with the intake valve is engaged by the first peak of the first cam lobe, the second expansion stroke including a second power stroke where the second fuel mass is ignited;

a sixth stroke immediately subsequent to the fifth stroke and forming a third compression stroke, the third compression stroke including the exhaust valve being in the closed position;

a seventh stroke immediately subsequent to the sixth stroke and forming a third expansion stroke, the third expansion stroke including the intake valve being in the closed position; and an eighth stroke immediately subsequent to the seventh stroke, the eighth stroke forming an exhaust stroke and including opening the exhaust valve via the second peak of the second cam lobe.

19. A method of operating an engine in an eight-stroke mode comprising:

a first stroke forming an intake stroke and including opening an intake valve via a first peak of a first cam lobe to provide communication between an air source and a combustion chamber formed by an engine structure defining a cylinder bore and a piston disposed within the cylinder bore, the first stroke further including providing a first fuel mass to the combustion chamber;

a second stroke immediately subsequent to the first stroke and forming a first compression stroke;

a third stroke immediately subsequent to the second stroke and forming a first expansion stroke, the first expansion stroke including a first power stroke where the air-fuel mixture provided in the first stroke is ignited;

a fourth stroke immediately subsequent to the third stroke and forming a second compression stroke, the fourth stroke including an exhaust valve in communication with the combustion chamber being in a closed position and preventing discharge of gas from within the combustion chamber when a valve lift mechanism engaged with the exhaust valve is engaged by a second peak of a second cam lobe;

a fifth stroke immediately subsequent to the fourth stroke and forming a second expansion stroke including the intake valve being in the closed position when a valve lift mechanism engaged with the intake valve is engaged by the first peak of the first cam lobe;

a sixth stroke immediately subsequent to the fifth stroke and forming a third compression stroke, the third compression stroke including the exhaust valve being in the closed position and providing a second fuel mass to the combustion chamber;

a seventh stroke immediately subsequent to the sixth stroke and forming a third expansion stroke, the third expansion stroke including a second power stroke where the second fuel mass is ignited; and an eighth stroke immediately subsequent to the seventh stroke, the eighth stroke forming an exhaust stroke and including opening the exhaust valve via the second peak of the second cam lobe.

* * * * *